United States Patent
Min et al.

(10) Patent No.: US 12,288,389 B2
(45) Date of Patent: Apr. 29, 2025

(54) LEARNING ORTHOGONAL FACTORIZATION IN GAN LATENT SPACE

(71) Applicant: NEC Laboratories America, Inc., Princeton, NJ (US)

(72) Inventors: Renqiang Min, Princeton, NJ (US); Hans Peter Graf, South Amboy, NJ (US); Ligong Han, Edison, NJ (US)

(73) Assignee: NEC Corporation, Tokyo (JP)

( * ) Notice: Subject to any disclaimer, the term of this patent is extended or adjusted under 35 U.S.C. 154(b) by 561 days.

(21) Appl. No.: 17/585,754

(22) Filed: Jan. 27, 2022

(65) Prior Publication Data

US 2022/0254152 A1     Aug. 11, 2022

Related U.S. Application Data

(60) Provisional application No. 63/191,620, filed on May 21, 2021, provisional application No. 63/146,845, filed on Feb. 8, 2021.

(51) Int. Cl.
| | |
|---|---|
| *G06V 10/82* | (2022.01) |
| *G06N 3/045* | (2023.01) |
| *G06V 10/62* | (2022.01) |
| *G06V 10/77* | (2022.01) |
| *G06V 10/80* | (2022.01) |

(52) U.S. Cl.
CPC ............. *G06V 10/82* (2022.01); *G06N 3/045* (2023.01); *G06V 10/62* (2022.01); *G06V 10/7715* (2022.01); *G06V 10/806* (2022.01)

(58) Field of Classification Search
CPC .. G06V 10/82; G06V 10/806; G06V 10/7715; G06V 10/62; G06N 3/045
See application file for complete search history.

(56) References Cited

PUBLICATIONS

Disentangled Sequential Autoencoder (Year: 2018).*
Recent Advances in Autoencoder-Based Representation Learning (Year: 2018).*
On Variational Bounds of Mutual Information (Year: 2019).*
Han et al., "Disentangled Recurrent Wasserstein Autoencoder", arXiv:2101.07496v1 [cs.LG], Jan. 19, 2021, pp. 1-21.

(Continued)

*Primary Examiner* — Jonathan S Lee
*Assistant Examiner* — Winta Gebreslassie
(74) *Attorney, Agent, or Firm* — Joseph Kolodka (57) ABSTRACT

A method for learning disentangled representations of videos is presented. The method includes feeding each frame of video data into an encoder to produce a sequence of visual features, passing the sequence of visual features through a deep convolutional network to obtain a posterior of a dynamic latent variable and a posterior of a static latent variable, sampling static and dynamic representations from the posterior of the static latent variable and the posterior of the dynamic latent variable, respectively, concatenating the static and dynamic representations to be fed into a decoder to generate reconstructed sequences, and applying three regularizers to the dynamic and static latent variables to trigger representation disentanglement. To facilitate the disentangled sequential representation learning, orthogonal factorization in generative adversarial network (GAN) latent space is leveraged to pre-train a generator as a decoder in the method.

15 Claims, 10 Drawing Sheets

(56) References Cited

PUBLICATIONS

Zhu et al., "S3VAE: Self-Supervised Sequential VAE for Representation Disentanglement and Data Generation", In Proceedings of the IEEE/CVF Conference on Computer Vision and Pattern Recognition, May 23, 2020, pp. 6538-6547.

Karras et al., "A Style-Based Generator Architecture for Generative Adversarial Networks", arXiv:1812.04948v3 [cs.NE], Mar. 29, 2019, pp. 1-12.

* cited by examiner

Priors

$$z_t \mid z_{<t} \sim \mathcal{N}(\mu_t, diag(\sigma_t^2))$$

Generation

$$p(x_{1:T}, z_{1:T}, z_f) = p(z_f) \prod_{t=1}^{T} p(x_t \mid z_f, z_t) p(z_t \mid z_{<t})$$

Inference

$$q(z_{1:T}, z_f \mid x_{1:T}) = q(z_f \mid x_{1:T}) \prod_{t=1}^{T} q(z_t \mid x_{\leq t})$$

Learning

$$\mathcal{L}_{VAE} = \mathbb{E}_{q(z_{1:T}, z_f \mid x_{1:T})} \left[ -\sum_{t=1}^{T} \log p(x_t \mid z_f, z_t) + \right.$$

$$\left. KL\left(q(z_f \mid x_{1:T}) \parallel p(z_f)\right) + \sum_{t=1}^{T} KL(q(z_t \mid x_{\leq t}) \parallel p(z_t \mid z_{\leq t}))\right]$$

LEARNING ORTHOGONAL FACTORIZATION IN GAN LATENT SPACE

RELATED APPLICATION INFORMATION

This application claims priority to Provisional Application No. 63/146,845, filed on Feb. 8, 2021, and Provisional Application No. 63/191,620, filed on May 21, 2021, the contents of both of which are incorporated herein by reference in their entirety.

BACKGROUND

Technical Field

The present invention relates to representation learning and, more particularly, to learning disentangled representations leveraging orthogonal factorization in generative adversarial network (GAN) latent space.

Description of the Related Art

Representation learning is an important issue in machine learning. The sensory data in the real world, such as video, image, and audio, are usually in the form of high dimensions. Representation learning aims to map these data into a low-dimensional space to make it easier to extract useful information for downstream tasks such as classification and detection. Recently there has been a rising interest in disentangled representations, which separate the underlying factors of observed data variation such that each factor exclusively interprets one semantic attribute of sensory data. For instance, a desirable disentanglement of artistic images can separate the style and content information. The representation of sequential data is expected to be disentangled as time-varying factors and time-invariant factors. For video data, the identity of the object is regarded as a time-invariant factor, and the motion in each frame is considered as a time-varying factor. In speech data, the representations of the identity of the speaker and the linguist content are expected to be disentangled. There are several benefits of disentangled representation. First, the learned models that produce disentangled representations are more explainable. Second, the disentangled representations make it easier and more efficient to manipulate data generation.

To learn disentangled representations of sequential data such as videos, a generative model such as a recurrent variational autoencoder (R-VAE) is often adopted. However, it is challenging to achieve both disentangled representation learning and high-quality video generation due to the complexities of spatiotemporal dependencies in video data.

SUMMARY

A method for learning disentangled representations of videos is presented. The method includes feeding each frame of video data into an encoder to produce a sequence of visual features, passing the sequence of visual features through a deep convolutional network to obtain a posterior of a dynamic latent variable and a posterior of a static latent variable, applying three regularizers to the dynamic and static latent variables to trigger representation disentanglement, sampling static and dynamic representations from the posterior of the static latent variable and the posterior of the dynamic latent variable, respectively, and concatenating the static and dynamic representations to be fed into a decoder to generate reconstructed sequences.

A non-transitory computer-readable storage medium comprising a computer-readable program for learning disentangled representations of videos is presented. The computer-readable program when executed on a computer causes the computer to perform the steps of feeding each frame of video data into an encoder to produce a sequence of visual features, passing the sequence of visual features through a deep convolutional network to obtain a posterior of a dynamic latent variable and a posterior of a static latent variable, applying three regularizers to the dynamic and static latent variables to trigger representation disentanglement, sampling static and dynamic representations from the posterior of the static latent variable and the posterior of the dynamic latent variable, respectively, and concatenating the static and dynamic representations to be fed into a decoder to generate reconstructed sequences.

A system for learning disentangled representations of videos is presented. The system includes a memory and one or more processors in communication with the memory configured to feed each frame of video data into an encoder to produce a sequence of visual features, pass the sequence of visual features through a deep convolutional network to obtain a posterior of a dynamic latent variable and a posterior of a static latent variable, apply three regularizers to the dynamic and static latent variables to trigger representation disentanglement, sample static and dynamic representations from the posterior of the static latent variable and the posterior of the dynamic latent variable, respectively, and concatenate the static and dynamic representations to be fed into a decoder to generate reconstructed sequences.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention introduce a sequential representation disentanglement and data generation framework for videos leveraging pretrained generative models of images. Specifically, the exemplary model generates high-resolution videos by re-using the generator in pretrained generative adversarial networks based on StyleGAN with orthogonalized latent space regularization trained on video frames and reduces the dependency between static part and dynamic part embeddings by minimizing a sample based mutual information upper bound. The mutual information between latent embeddings and the input data is meanwhile maximized to ensure the representativeness of the latent embeddings (e.g., style and content embeddings), by minimizing a Wasserstein distance between the generated data distribution and the real data distribution. To make sure that the sequential prior for the dynamic part can be effectively learned from complex sequential data, the exemplary methods propose a teacher-forcing approach.

The exemplary methods learn an orthogonal linear transformation M that maps W to a disentangled latent space with low total correlation (TC). The additional loss term minimizes the total correlation of projected W and forces the orthogonality of M by a penalty term, $TC(MW)+\lambda \|MM^T - I\|_2^2$. It is noted that columns in $M^T$ represent the semantic editing directions in W space. Since MW is disentangled, learning a mapping to the W space will be easier.

The generative adversarial networks (GAN) in deep learning estimate how data points are generated in a probabilistic framework. GAN includes two interacting neural networks, that is, a generator, G, and a discriminator, D, which are trained jointly through an adversarial process. The objective of G is to synthesize fake data that resemble real data, while the objective of D is to distinguish between real and fake data. Through an adversarial training process, the generator can generate fake data that match the real data distribution.

StyleGANs, on the other hand, propose a novel style-based generator architecture and attain state-of-the-art visual quality on high-resolution images. As StyleGANs can effectively encode rich semantic information in the latent space, the latent code can be edited and images can be synthesized with various attributes, such as aging, expression, and light direction. However, such manipulations in the latent space are only applicable to images generated from GANs rather than to any given real images due to the lack of inference functionality or the encoder in GANs.

In contrast, GAN inversion aims to invert a given image back into the latent space of a pretrained generator. The image can then be faithfully reconstructed from the inverted code by the generator. GAN inversion enables the controllable directions found in latent spaces of the existing trained GANs to be applicable to real image editing, without requiring ad-hoc supervision or expensive optimization. StyleGAN is known to have a disentangled latent space which offers control and editing capabilities and it has become common practice to encode real images into an extended latent space, W+, defined by the concatenation of 'n' different 512-dimensional w vectors (or styles).

The advantages of the exemplary embodiments can be summarized as follows:

The exemplary embodiments introduce a principal framework to learn disentangled representations of videos. To decouple high-resolution video generation and disentangled sequential representation learning, the exemplary methods re-use the generator in pretrained generative adversarial networks (StyleGAN) trained on video frames as a decoder in the disentangled recurrent VAE (DR-VAE). In the DR-VAE, the exemplary methods update an encoder that maps video frame images to the W space in StyleGAN but fix the decoder (generator) that maps W's to video frames (images). By minimizing a novel VI-based disentangled representation learning (DRL) objective, the exemplary model not only explicitly reduces the correlation between static part and dynamic part embeddings, but also preserves the input sequence information in the latent spaces at the same time.

Moreover, the exemplary methods employ a general sample-based mutual information upper bound to facilitate the minimization of the VI-based objective. With this upper bound, the dependency of static and dynamic embeddings can be decreased effectively and stably. The exemplary methods further employ a scheduled teacher-forcing approach to effectively learn the sequential prior for the time-varying factors. To decouple high-resolution video generation and disentangled sequential representation learning, the exemplary methods re-use the generator in pre-trained generative adversarial networks (StyleGAN) trained on video frames with possible data augmentation as a decoder in the disentangled recurrent VAE (DR-VAE).

The generator in generative adversarial networks (StyleGAN) pretrained on video frames with possible data augmentation as decoder enables the exemplary model to work on small video datasets. In the DR-VAE, the exemplary methods update an encoder that maps video frame images to the W space in StyleGAN but fix the decoder (generator) that maps W's to video frames (images). The model learns effective disentangled sequential representations of videos by simultaneously minimizing a Wasserstein distance regularization and a KL divergence regularization with theoretical support. The model further minimizes the mutual information between different latent embeddings by using sample-based adversarial training with theoretical support. The exemplary methods also employ a scheduled teacher-forcing approach to effectively learn the sequential prior for the time-varying factors from complex sequential data.

The prior distribution of latent code is given as:

$$p(z)=p(z_f)p(z_{1:T})=p(z_f)\Pi_{t=1}^T p(z_t|z_{<t}).$$

The prior of $z_f$ is defined as a standard Gaussian distribution: $z_f \sim \mathcal{N}(0,1)$.

The time-varying latent variable $z_{1:T}$ follows a recurrent prior as follows:

$$z_t|z_{<t} \sim \mathcal{N}(\mu_t, \text{diag}(\sigma_t^2)),$$

where $[\mu_t, \sigma_t]=\emptyset_R^{prior}(z_{<t})$, $\mu_t, \sigma_t$ are the parameters of the prior distribution conditioned on all previous time-varying latent variables.

Figure 4:
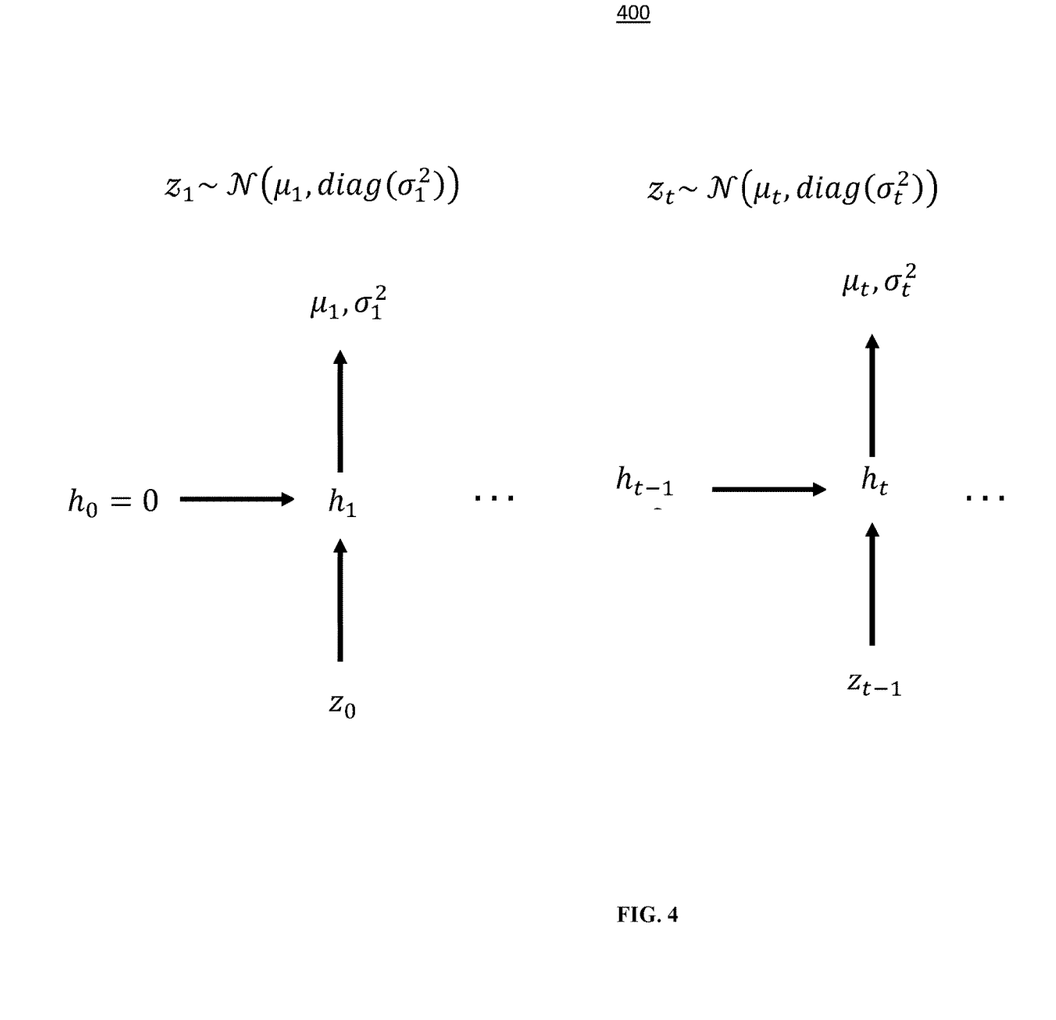
FIG. 4 is a block/flow diagram of computing the priors during training, in accordance with embodiments of the present invention.

Learning a recurrent neural network (RNN) prior for a R-VAE without teacher forcing involves:

During training, the prior is computed as follows (see FIG. 4):

$$z_1 \sim \mathcal{N}(\mu_1, \text{diag}(\sigma_1^2)) \text{ and } z_t \sim \mathcal{N}(\mu_t, \text{diag}(\sigma_t^2))$$

Learning a RNN Prior for R-VAE with scheduled teacher forcing involves:

During training, the prior is computed as follows (see FIG. 4):

$$z_1 \sim \mathcal{N}(\mu_1, \text{diag}(\sigma_1^2)) \text{ and } z_t \sim \mathcal{N}(\mu_t, \text{diag}(\sigma_t^2))$$

The exemplary methods use $z_{t-1}$ calculated from the posterior distribution $q(z_t|x_{\leq t})$ for all $t \geq 2$ with user-specified hyperparameter probability p ($p \leq 1$). When specified as $p=1$, it is called teacher forcing and when specified as $p<1$, it is called scheduled teacher forcing.

Certain notations and the problem definition will now be described.

$D=\{X^i\}^M$ is given as a dataset that includes M independent and identically distributed (i.i.d.) sequences, where $Z \equiv x_{1:T} = (x_1, x_2, \ldots, x_T)$ denotes a sequence of T observed variables, such as a video of T frames. Sequential variational encoder models are adopted herein. It is presumed that the sequence is generated from a latent variable z. The latent variable z is factorized into two disentangled factors, that is, a time-invariant variable $z_f$ and the time-varying factor $z_{1:T}$.

Regarding priors, the prior of $z_f$ is defined as a standard Gaussian distribution: $z_f \sim \mathcal{N}(0,1)$.

The time-varying latent variable $z_{1:T}$ follows a recurrent prior as follows:

$$z_t|z_{<t} \sim \mathcal{N}(\mu_t, \text{diag}(\sigma_t^2)), \quad (1)$$

where $[\mu_t, \sigma_t] = \varnothing_R^{prior}(z_{<t})$, $\mu_t, \sigma_t$ are the parameters of the prior distribution conditioned on all previous time-varying latent variables. The model $\varnothing_R^{prior}$ can be parameterized as a recurrent network, such as long short-term memory (LSTM) or gated recurrent unit (GRU), where the hidden state is updated temporarily. The prior can be factorized as:

$$p(z)=p(z_f)p(z_{1:T})=p(z_f)\Pi_{t=1}^T p(z_t|z_{<t}) \quad (2)$$

Regarding generation, the generating distribution of time step t is conditioned on $z_f$ and $z_t$.

$$\text{Also}, x_t|z_f z_t \sim \mathcal{N}(\mu_{x,t}, \text{diag}(\sigma_{x,t}^2)) \quad (3)$$

where $[\mu_{x,t}, \sigma_{x,t}] = \varnothing^{Decoder}$ can be a highly flexible function such as neural networks.

The complete generative model can be formalized by factorization:

$$p(x_{1:T}, z_{1:T}, z_f) = p(z_f)\Pi_{t=1}^T p(x_t|z_f z_t) p(z_t|z_{<t}) \quad (4)$$

Regarding inference, the sequential VAE in accordance with the present invention uses variational inference to learn an approximate posterior $q(z_f|x_{1:T})$ and $q(z_t|x_{\leq t})$:

$$z_f \sim \mathcal{N}(\mu_f, \text{diag}(\sigma_f^2)), z_t \sim \mathcal{N}(\mu_t, \text{diag}(\sigma_t^2)), \quad (5)$$

where $[\mu_f, \sigma_f] = \psi_f^{Encoder}(x_{1:T})$ and $[\mu_t, \sigma_t] = \psi_R^{Encoder}(x_{\leq t})$.

The inference model in accordance with the present invention is factorized as:

$$q(z_{1:T}, z_f|x_{1:T}) = q(z_f|x_{1:T})\Pi_{t=1}^T q(z_t|x_{\leq t}) \quad (6)$$

Regarding learning, the objective function of sequential VAE is a timestep-wise negative variational lower bound:

$$\mathcal{L}_{VAE} = \mathbb{E}_{q(z_{1:T}, z_f|x_{1:T})}[-\Sigma_{t=1}^T \log p(x_t|z_f z_t) + KL(q(z_f|x_{1:T})\|p(z_f)) + \Sigma_{t=1}^T KL(q(z_t|x_{\leq t})\|p(z_t|z_{<t}))] \quad (7)$$

It is noted that the model in accordance with the present invention is different from a conventional variational recurrent autoencoder, which fails in considering the latent representation disentanglement. Besides, DSVAE assumes that the variational posterior of $z_{1:T}$ depends on $z_f$ and thus it first infers $z_f$ and then samples $z_t$ conditioned on $z_f$, which implies the variables are still implicitly entangled. In contrast, here $z_f$ and $z_t$ are inferred totally independently to enforce the representation disentanglement, thus resulting in a more efficient and concise model.

$p(x_t|z_f, z_t)$ includes a pretrained decoder that has a learned multilayer perceptron (MLP) that maps ($z_f, z_t$) to the W space in StyleGAN and a fixed generator in StyleGAN pretrained on video frames with possible data augmentation that maps W's to video frames. That is to say, in the neural network $p(x_t|z_f, z_t)$, the parameters of the MLP that maps ($z_f, z_t$) to the W's are learned while the parameters of the generator that maps W's to video frames are fixed.

When learning the recurrent prior $p(z_t|z_{\leq t})$ to minimize the KL divergence in Equation 7, different from all previous models, with a user-specified hyperparameter probability p ($p \leq 1$), the exemplary methods use $z_{t-1}$ calculated from the posterior distribution $q(z_t|x_{\leq t})$ (for all $t \geq 2$) to replace $z_{t-1}$ sampled from the previous time step $z_t \sim \mathcal{N}(\mu_t, \text{diag}(\sigma_t^2))$. When the user-specified hyperparameter is $p=1$, it is called teacher forcing, whereas when the user-specified hyperparameter is $p<1$, it is called scheduled teacher forcing. This technique is important because it's challenging to learn a flexible and powerful recurrent prior distribution for modeling complex sequential data without any supervision. This teacher forcing technique for learning prior distributions is general and can be easily generalized to many other latent-variable generative models with complex priors.

In the framework of the proposed model in the context of video data, each frame of the video $x_{1:T}$ is fed into the encoder to produce a sequence of the visual features, which is then passed through the LSTM to obtain the manifold posterior of the dynamic latent variable $\{q(z_t|x_{\leq t})\}T_{t=1}$ and the posterior of the static latent variable $q(z_f|x_{1:T})$. The static and dynamic representations $z_f$ and $z_{1:T}$ are sampled, from the corresponding posteriors and concatenated to be fed into the decoder to generate reconstructed sequence $x_{1:T}$. Three regularizors are imposed on dynamic and static latent variables to encourage the representation disentanglement.

To encourage the time-invariant representation $z_f$ to exclude any dynamic information, it is expected that $z_f$ changes little when dynamic information dramatically varies. Therefore, the mutual information of static and dynamic factors is introduced as a regulator $\mathcal{L}_{MI}$. The mutual information is a measure of the mutual dependence between two variables. The formal definition is the Kullback-Leibler divergence of the joint distribution to the product of marginal distribution of each variable:

$$\mathcal{L}_{MI}(z_f, z_{1:T}) = \Sigma_{t=1}^T KL(q(z_f z_t) \| q(z_f) q(z_t))$$

By minimizing the mutual information of static factor c with content embedding $z_f$ and dynamic factor m with motion embedding $\{z_t\}$, the information in these two factors is enabled to be mutually exclusive. To disentangle the static and dynamic embeddings, the mutual information between c and m is minimized as I(m; c). Meanwhile, the latent embeddings c and m should sufficiently, respectively, include content information and motion information from videos x. Therefore, I(c; x) and I(m; x) are maximized at the same time. To sum up, the overall disentangled representation learning objective in accordance with an embodiment of the present invention is as follows:

$$\mathcal{L}_{Dis} = [I(m;c) - I(x;c) - I(x;m)].$$

A description will now be given regarding a theoretical justification to the objective, in accordance with an embodiment of the present invention.

The objective $\mathcal{L}_{Dis}$ has a strong connection with the dependence measurement in information theory. Variation of Information (VI) is a well-defined metric of independence between variables. Applying the triangle inequality to m, c and x, the following is obtained:

$$VI(m;x) + VI(x;c) \geq VI(m;c) \quad (8)$$

The equality reaches if and only if the information from variable x is totally separated into two independent variables m and c, which is an ideal scenario for disentangling sentence x into style embedding s and content embedding c. Therefore, the difference between the left-hand side and the right-hand side in Equation (8) measures the degree of disentanglement as follows:

$$D(x;m,c)=VI(m;x)+VI(x;c)-VI(c;m).$$

By the definition of VI, D(x; s, c) can be simplified to the following:

$$VI(c;x)+VI(x;m)-VI(m;c)=2H(x)+2[I(m;c)-I(x;c)-I(x;m)].$$

Since H(x) is a constant derived from data, only I(m; c)−I(x; c)−I(x; m) is minimized, which is exactly the same as the objective $\mathcal{L}_{Dis}$.

However, minimizing the exact value of mutual information in the objective $\mathcal{L}_{Dis}$ will cause numerical instability, especially when the dimension of latent embeddings is large. Therefore, several mutual information (MI) estimations are introduced herein to effectively learn disentangled representations.

Because minimizing the Wasserstein distance between the model distribution and sequential data distribution simultaneously maximizes the mutual information between input data and different disentangled latent factors, this Wasserstein distance is minimized to enforce the mutual information maximization for the last two terms in $\mathcal{L}_{Dis}$. The exemplary methods use the Jensen-Shannon divergence for the penalty of static embedding c and maximum mean discrepancy (MMD) for the penalty of dynamic embedding. The models can be trained in a short length of sequence and tested in the arbitrary length of sequences. The prior distribution distributions of the static and dynamic factors are described in Equation (1) and (2).

$$\mathbb{D}(Q_{Z^c}, P_{Z^c}) = \mathbb{D}_{JS}(Q_{Z^c}, P_{Z^c});$$

$$\mathbb{D}\left(Q_{Z_T^m|z_{<t}^m}, P_{Z_T^m|z_{<t}^m}\right) = MMD_k\left(Q_{Z_T^m|z_{<t}^m}, P_{Z_T^m|z_{<t}^m}\right).$$

$$MMD_k(q(z^c), p(z^c)) =$$

$$\frac{1}{n(n-1)}\sum_{i \neq j} k(z_i, z_j) + \frac{1}{n(n-1)}\sum_{i \neq j} k(\tilde{z}_i, \tilde{z}_j) - \frac{1}{n^2}\sum_{i,j} k(z_i, \tilde{z}_j).$$

$$k(x, y) = \exp\left(-\frac{\|x-y\|^2}{2\sigma^2}\right)$$

Each video x is encoded into content embedding c and motion embedding m. A network $p_\sigma(m|c)$ helps disentangle motion and content embeddings. The motion embedding m and content embedding c are expected to be independent by minimizing mutual information I(m; c). A description will now be given regarding an MI sample-based upper bound, in accordance with an embodiment of the present invention.

To estimate I(m; c), a novel sample based upper bound is proposed. It is assumed there are M latent embedding pairs $$\{(m_j, c_j)\}\frac{M}{j=1}$$

drawn from p(m, c). As shown in the following Theorem, an upper bound of mutual information is derived based on the samples.

Theorem: If $(m_j, c_j) \sim p(m, c)$, $j=1, \ldots, M$, then $$I(m; c) \leq \mathbb{E}\left[\frac{1}{M}\sum_{j=1}^{M} R_j\right] = \hat{I}(m, c), \text{ where} \quad (10)$$

$$R_j = \log p(m_j|c_j) - \frac{1}{M}\sum_{k=1}^{M} \log p(m_j|c_k).$$

Based on the Theorem, given embedding samples $$\{m_j, c_j\}\frac{M}{j=1}, \frac{1}{M}\sum_{j=1}^{M} R_j$$

can be minimized as an unbiased upper bound of I(m; c). To calculate $R_j$, the condition distribution p(m|c) is required. Two solutions are proposed to obtain the conditional distribution p(m|c): (1) using the Bayesian rule, derive the p(m|c) from the variational encoder distribution p(m, c|x) and p(c|x), and (2) using a neural network $p_\sigma(m|c)$ to approximate p(m|c). In practice, the first approach is not numerically stable. Instead, the neural network approximation is focused on.

In an implementation, M videos $\{x_j\}$ is first encoded into the encoder $q_\theta(m, c|x)$ to obtain the sampled embedding pairs $\{(m|c_j)\}$. Then the condition distribution $p_\sigma(c|x)$ is trained by maximizing the loglikelihood $$\frac{1}{M}\sum_{j=1}^{M} \log p_\sigma(m_j|c_j).$$

After the training of $p_\sigma((m|c))$ is finished, $R_j$ is calculated for each embedding pair $(m_j, c_j)$. Finally, the gradient for $$\frac{1}{M}\sum_{j=1}^{M} R_j$$

is calculated and backpropagated to the encoder $q_\theta(m, c|x)$. The reparameterization trick is applied to ensure the gradient back-propagating through the sampled embeddings $(m_j, c_j)$. When the encoder weights update, the distribution $q_\theta(m, c|x)$ changes, which leads to the changing of conditional distribution p(m|c). Therefore, the approximation network $p_\sigma(m|c)$ needs to be updated again. Consequently, in the training scheme, the encoder network $q_\theta(m, c|x)$ and the approximation network $p_\sigma(m|c)$ are alternatively updated.

A description will now be given regarding an encoder/decoder framework, in accordance with an embodiment of the present invention. One downstream task for disentangled representation learning (DRL) is conditional generation. The MI-based video DRL method of the present invention can be also embedded into an Encoder-Decoder generative model and be trained in an end-to-end scheme. Since the proposed DRL encoder $q_\theta(s, c|x)$ is a stochastic neural network, a natural extension is adding a decoder to build a variational autoencoder with the loss $\mathcal{L}_{VAE}$ as described in Equation 7.

The VAE objective and the MI based disentanglement terms are combined to form an end-to-end learning framework. The total loss function is $$\mathcal{L} = \mathcal{L}_{VAE} + \lambda_1 \mathcal{L}_{JS} + \lambda_2 \mathcal{L}_{MMD} + \lambda_3 \mathcal{L}_{MI} \quad (11)$$

where $\lambda_1$, $\lambda_2$ and $\lambda_3$ are balancing factors.

Figure 1:
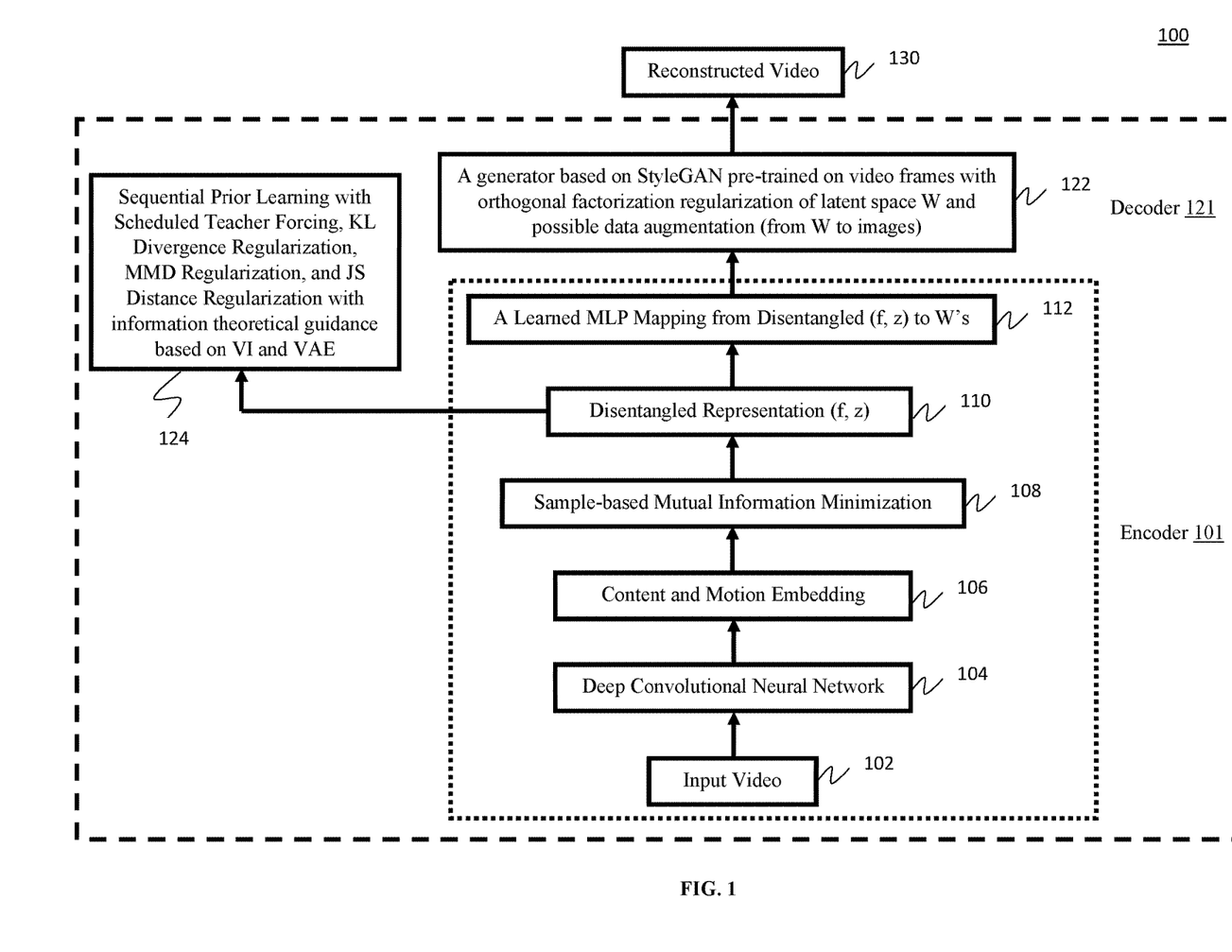
FIG. 1 is a block/flow diagram of an exemplary system for learning disentangled representations of videos, in accordance with embodiments of the present invention.

FIG. 1 is a block/flow diagram of an exemplary system 100 for learning disentangled representations of videos, in accordance with embodiments of the present invention.

An input video 102 is fed into the deep convolutional neural network 104. Content and motion embedding 106 takes place before sample-based mutual information minimization 108 is enabled. Disentangled representations 110 are derived and a learned MLP mapping 112 is performed from disentangled (f, z) to W's. Elements 102, 104, 106, 108, 110, 112 are associated with the encoder 101. After the learned MLP mapping 122 is performed, a generator based on StyleGAN pretrained on video frames 122 is used to perform with possible data augmentation (from W's images). Additionally, the disentangled representations 110 are exposed to the three regularizers in block 124 which includes sequential prior learning with scheduled teacher forcing, KL divergence regularization, MMD regularization, and Jensen-Shannon (JS) distance regularization with information theoretical guidance based on VI and VAE. Finally, the reconstructed video 130 is generated. Elements 122, 124 are associated with the decoder 121.

Figure 2:
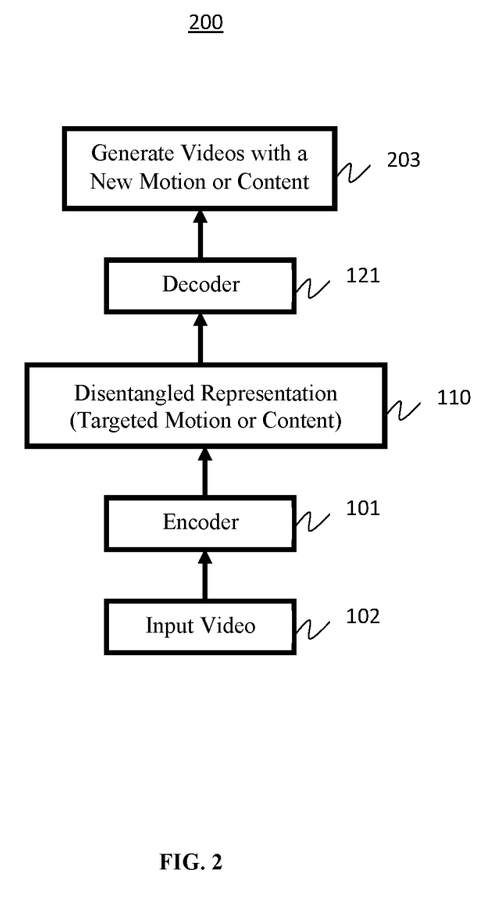
FIG. 2 is a block/flow diagram of a method for generating videos with a new motion or content, in accordance with embodiments of the present invention.

FIG. 2 is a block/flow diagram of a method 200 for generating videos with a new motion or content, in accordance with embodiments of the present invention.

Frames from the input video 102 are provided to the encoder 101 to generate disentangled representations 110. The disentangled representations 110 are provided to the decoder 121 for generation of videos 203 with a new motion or content.

Figure 3:
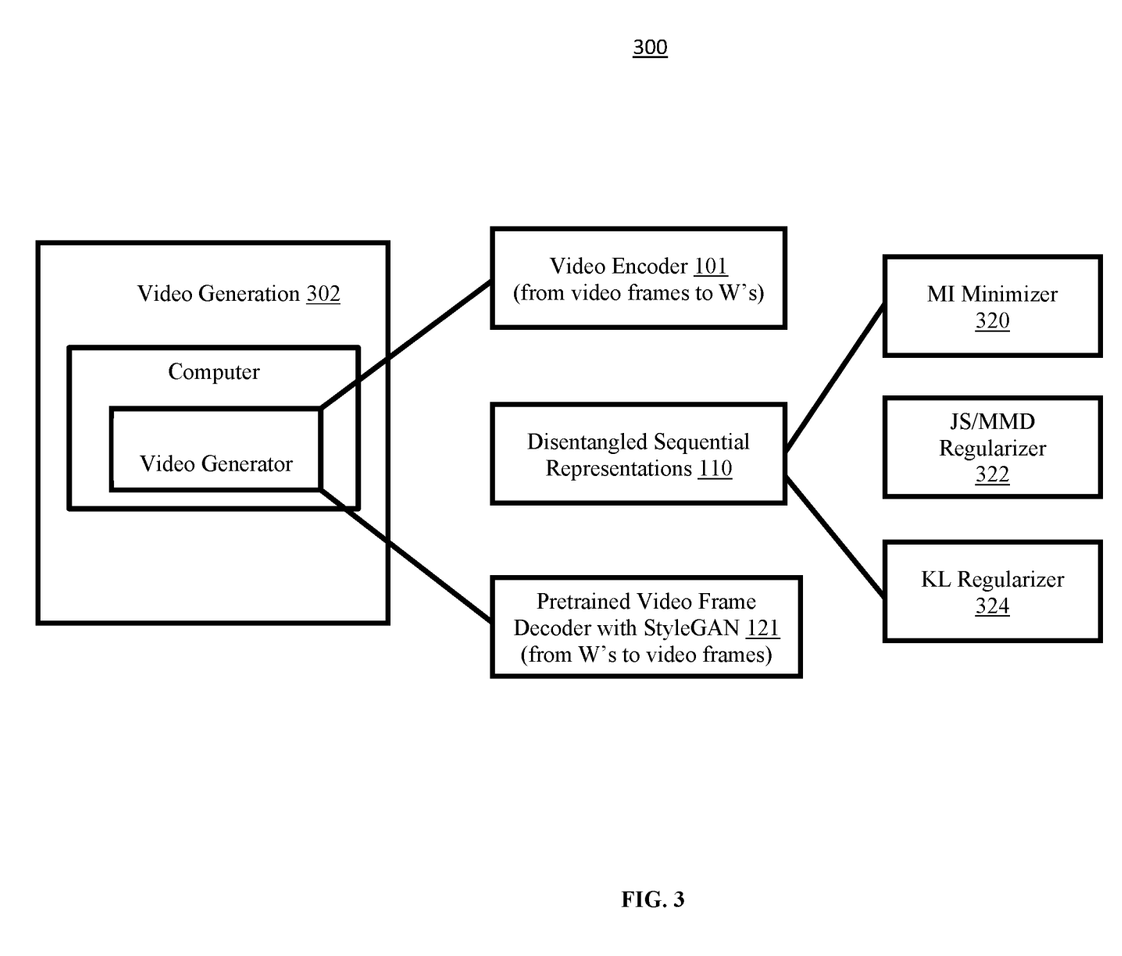
FIG. 3 is a block/flow diagram illustrating applying three regularizers on dynamic and static latent variables to enable the representation disentanglement, in accordance with embodiments of the present invention.

FIG. 3 is a block/flow diagram 300 illustrating applying three regularizers on dynamic and static latent variables to enable the representation disentanglement, in accordance with embodiments of the present invention.

The video generation 302 includes a video generator communicating with a video encoder 101 to generate disentangled sequential representations 110 and communicating with a pretrained video frame decoder 121 with StyleGAN. The disentangled representations 110 are exposed to the three regularizers, that is MI minimizer 320, JS/MMD regularizer 322, and KL regularizer 324.

FIG. 4 is a block/flow diagram 400 of computing the priors during training, in accordance with embodiments of the present invention.

In conclusion, learning semantically meaningful directions in GAN's latent space has become an important research area which enables applications such as image editing and animation. The exemplary methods focus on learning an orthogonal factorization of the latent space of GANs for disentangled manifold discovery in an unsupervised fashion. The exemplary methods propose to learn a set of orthogonal directions, in the latent space of GAN, that produces meaningful transformations in image space and defines a disentangled projected latent space by its transpose. Then the exemplary methods utilize this disentangled latent space and the pretrained generator of GAN to help learn disentangled representations of sequences such as videos with several regularizations.

Moreover, the exemplary methods learn an orthogonal linear transformation that maps latent space of GANs to a disentangled latent space with low total correlation (TC). The additional loss term minimizes the total correlation of the projected latent vectors and forces the orthogonality of the linear transformation. The columns in the transposed linear transformation matrix represent the semantic editing directions in the space. Moreover, the exemplary methods re-use the pre-trained generator of GAN as a decoder to generate sequences for learning disentangled representations of sequences.

Figure 5:
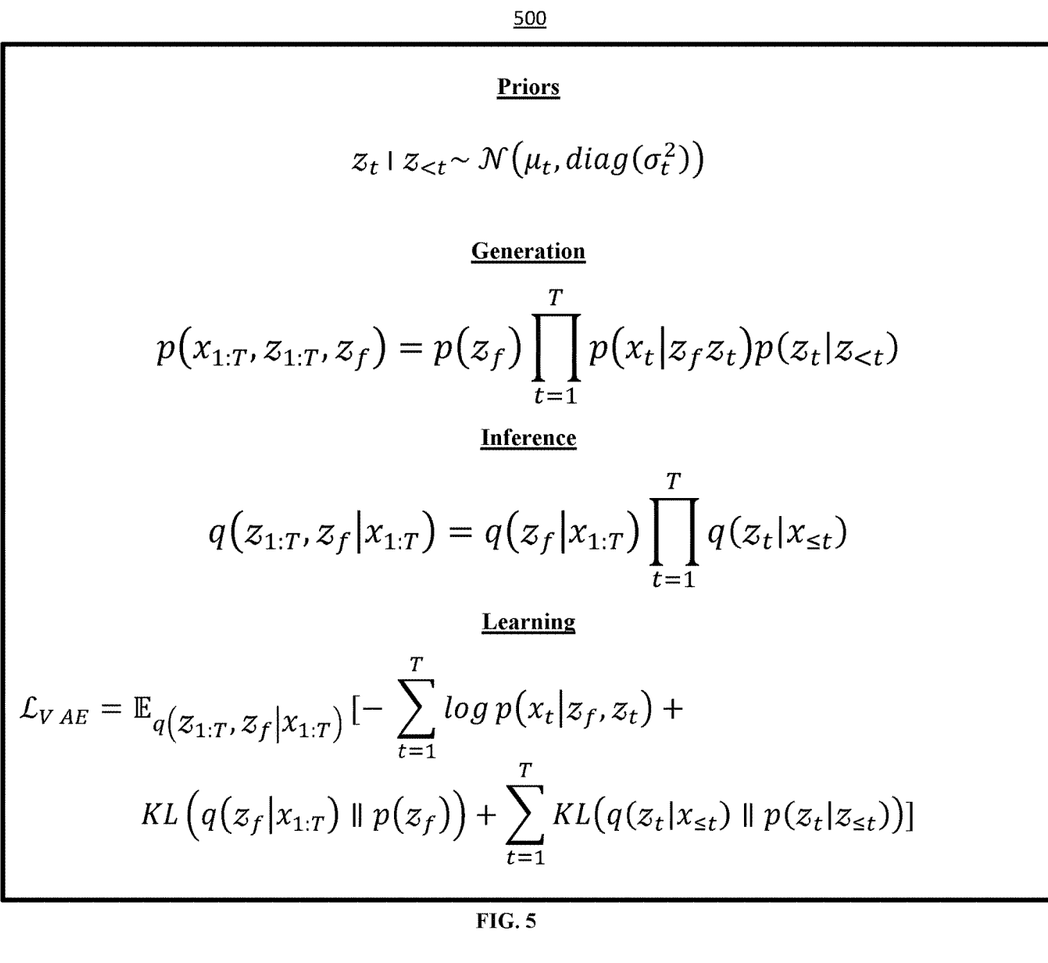
FIG. 5 is a block/flow diagram of exemplary equations for learning disentangled representations of videos, in accordance with embodiments of the present invention.

FIG. 5 is a block/flow diagram of exemplary equations for learning disentangled representations of videos, in accordance with embodiments of the present invention.

Equations 500 include priors, generation, inference, and learning equations.

Figure 6:
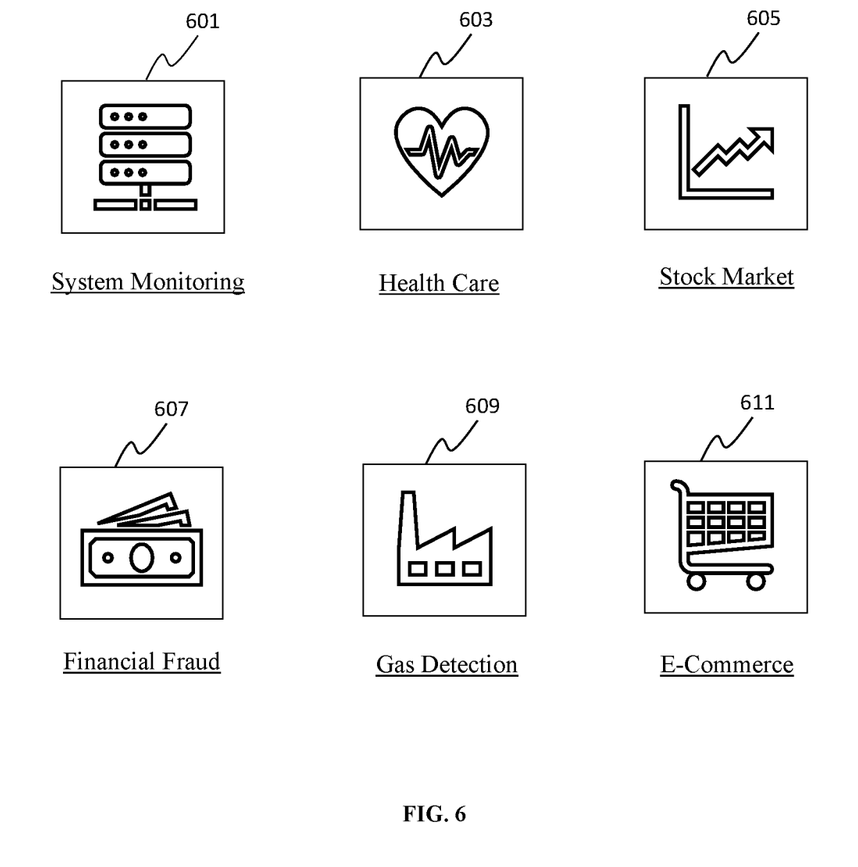
FIG. 6 is a block/flow diagram of an exemplary practical application for learning disentangled representations of videos, in accordance with embodiments of the present invention.

FIG. 6 is a block/flow diagram of an exemplary practical application for learning disentangled representations of videos, in accordance with embodiments of the present invention.

Practical applications for learning and forecasting trends in multivariate time series data can include, but are not limited to, system monitoring 601, healthcare 603, stock market data 605, financial fraud 607, gas detection 609, and e-commerce 611. The time-series data in such practical applications can be collected by sensors 710 (FIG. 7).

Figure 7:
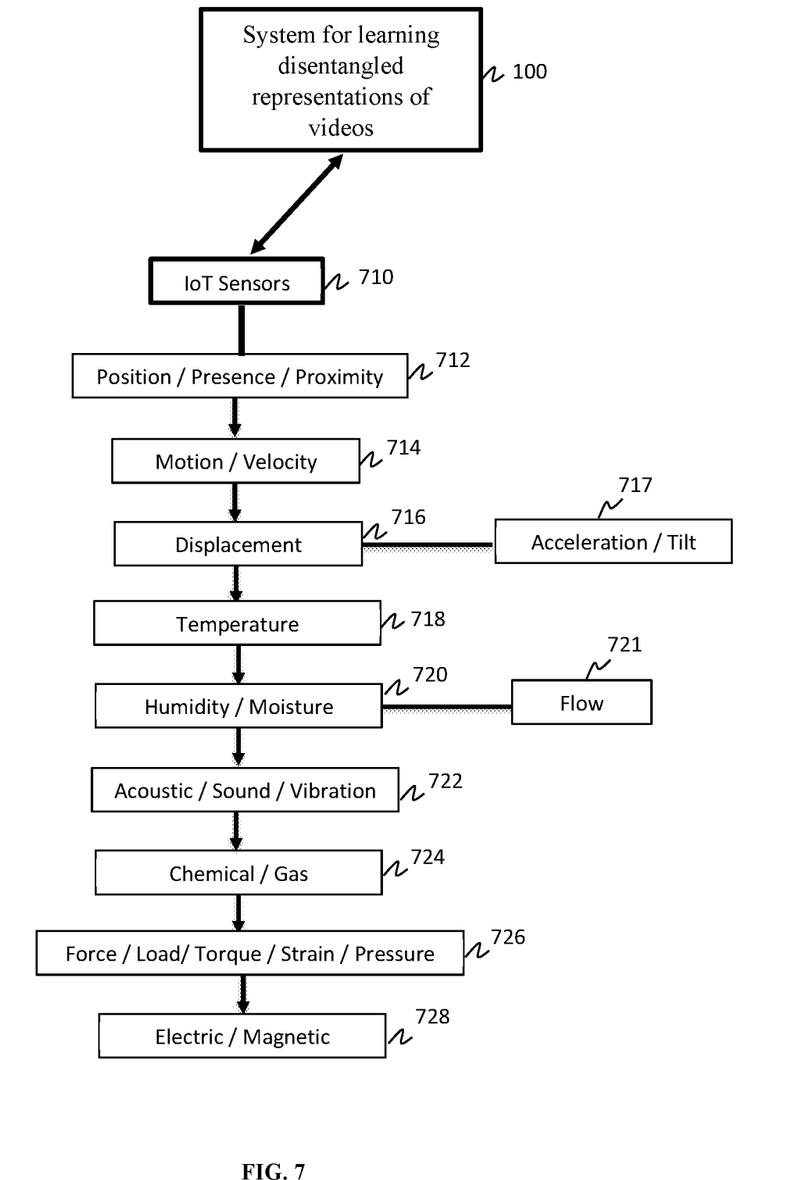
FIG. 7 is a block/flow diagram of exemplary Internet-of-Things (IoT) sensors used to collect data/information for learning disentangled representations of videos, in accordance with embodiments of the present invention.

FIG. 7 is a block/flow diagram of exemplary Internet-of-Things (IoT) sensors used to collect data/information for learning disentangled representations of videos, in accordance with embodiments of the present invention.

IoT loses its distinction without sensors. IoT sensors act as defining instruments which transform IoT from a standard passive network of devices into an active system capable of real-world integration.

The IoT sensors 710 can communicate with the system 100 for learning disentangled representations of video to process information/data, continuously and in in real-time. Exemplary IoT sensors 710 can include, but are not limited to, position/presence/proximity sensors 712, motion/velocity sensors 714, displacement sensors 716, such as acceleration/tilt sensors 717, temperature sensors 718, humidity/moisture sensors 720, as well as flow sensors 721, acoustic/sound/vibration sensors 722, chemical/gas sensors 724, force/load/torque/strain/pressure sensors 726, and/or electric/magnetic sensors 728. One skilled in the art can contemplate using any combination of such sensors to collect data/information for input into the system 100 for learning disentangled representations of video for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover, data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

Figure 8:
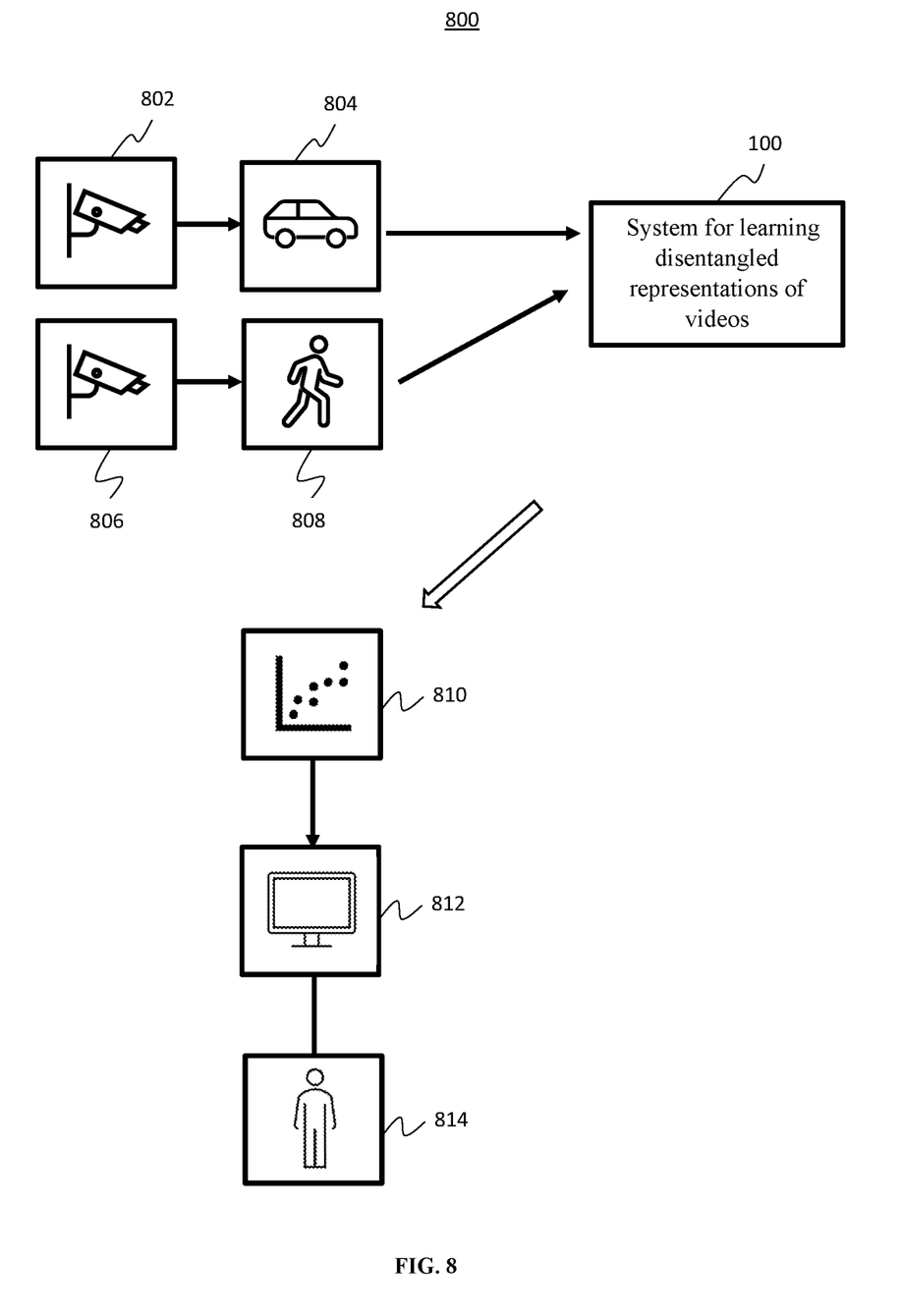
FIG. 8 is an exemplary practical application for learning disentangled representations of videos, in accordance with embodiments of the present invention.

FIG. 8 is a block/flow diagram 800 of a practical application for learning disentangled representations of videos, in accordance with embodiments of the present invention.

In one practical example, a first camera 802 detects an object, such as a vehicle 804 and a second camera 806 detects an object, such as a person 808. The objects 804, 808 are processed by the system 100 for learning disentangled representations of video. The results 810 (e.g., variables or parameters or factors or features) can be provided or displayed on a user interface 812 handled by a user 814.

Figure 9:
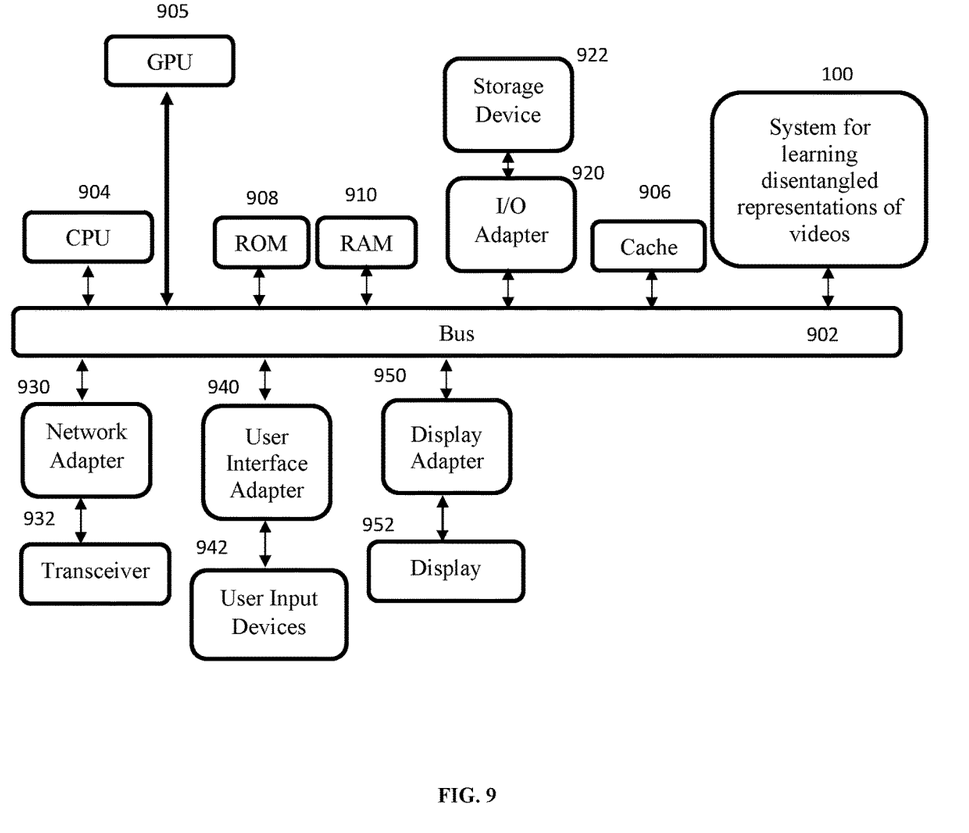
FIG. 9 is an exemplary processing system for learning disentangled representations of videos, in accordance with embodiments of the present invention.

FIG. 9 is an exemplary processing system for learning disentangled representations of videos, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the system 100 for learning disentangled representations of video can be employed.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 10:
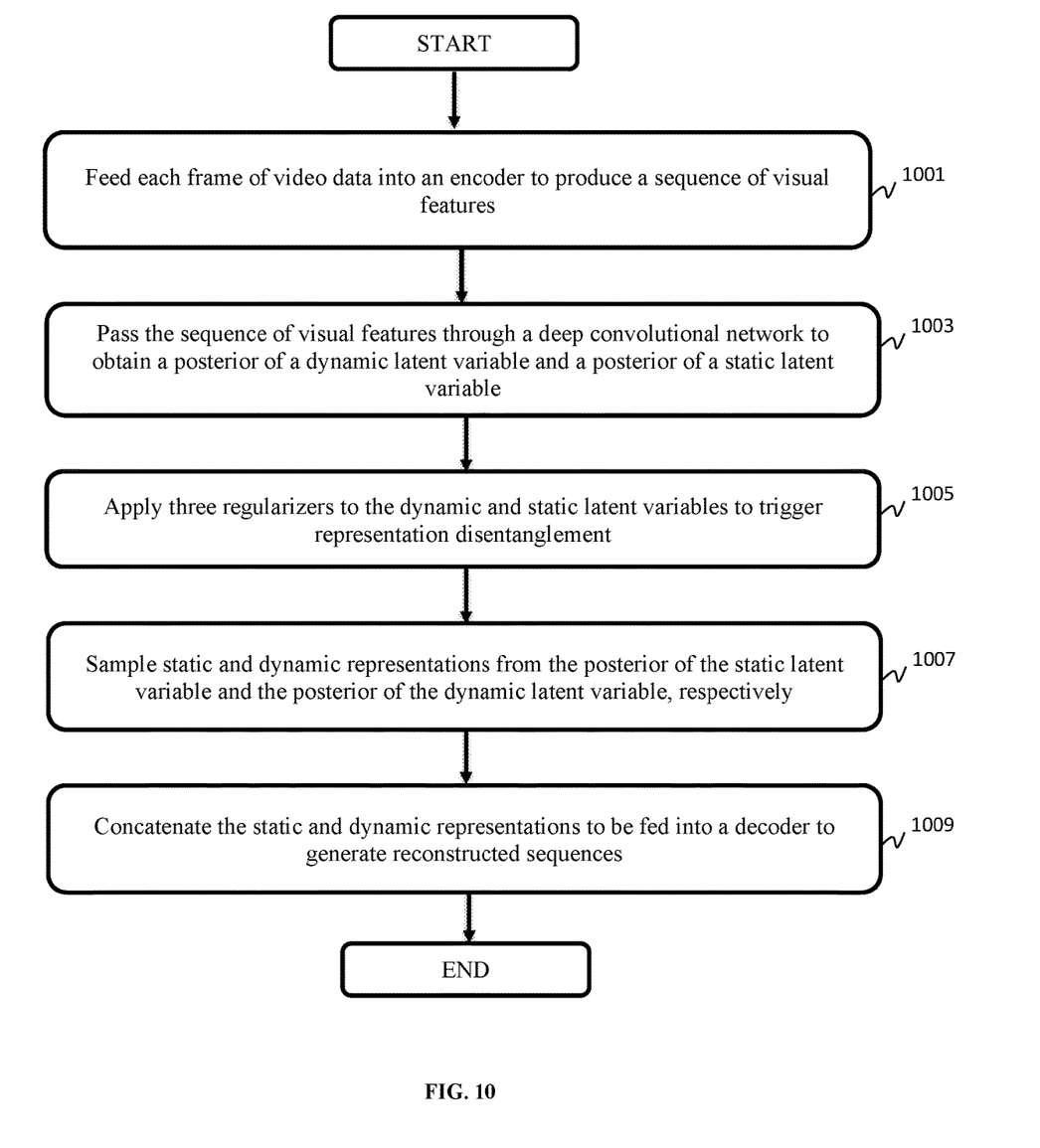
FIG. 10 is a block/flow diagram of an exemplary method for learning disentangled representations of videos, in accordance with embodiments of the present invention.

FIG. 10 is a block/flow diagram of an exemplary method for learning disentangled representations of videos, in accordance with embodiments of the present invention.

At block 1001, feed each frame of video data into an encoder to produce a sequence of visual features.

At block 1003, pass the sequence of visual features through a deep convolutional network to obtain a posterior of a dynamic latent variable and a posterior of a static latent variable.

At block 1005, apply three regularizers to the dynamic and static latent variables to trigger representation disentanglement.

At block 1007, sample static and dynamic representations from the posterior of the static latent variable and the posterior of the dynamic latent variable, respectively.

At block 1009, concatenate the static and dynamic representations to be fed into a decoder to generate reconstructed sequences.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for learning disentangled representations of videos, the method comprising:
   feeding each frame of video data into an encoder to produce a sequence of visual features;
   passing the sequence of visual features through a deep convolutional network to obtain a posterior of a dynamic latent variable and a posterior of a static latent variable;
   applying Jensen-Shannon divergence for a penalty of static embedding and maximum mean discrepancy for a penalty of dynamic embeddings, and simultaneously minimizing a Wassertein distance and a Kullback-Liebler divergence regularization to trigger representation disentanglement;
   sampling static and dynamic representations from the posterior of the static latent variable and the posterior of the dynamic latent variable, respectively, with a general sample-based mutual information upper bound employed with a neural network to approximate a conditional distribution to facilitate minimization of a disentangled representation learning (DRL) objective and to reduce dependency of static and dynamic embeddings; and
   concatenating the static and dynamic representations to be fed into a decoder to generate reconstructed sequences.

2. The method of claim 1, wherein mutual information of a static factor and a dynamic factor is introduced as a regulator.

3. The method of claim 2, wherein the mutual information of the static factor is minimized with content embedding and the mutual information of the dynamic factor is minimized with motion embedding to enable mutual exclusivity between the static and dynamic factors.

4. The method of claim 1, wherein a set of orthogonal directions is learned in a latent space of generative adversarial networks (GANs) to produce meaningful transformations in an image space and to define a disentangled projected latent space by its transpose.

5. The method of claim 4, wherein an orthogonal linear transformation that maps latent space of the GANs to a disentangled latent space with low total correlation (TC) is learned, where an additional loss term minimizes a total correlation of projected latent vectors and forces orthogonality of the linear transformation.

6. A non-transitory computer-readable storage medium comprising a computer-readable program for learning disentangled representations of videos, wherein the computer-readable program when executed on a computer causes the computer to perform the steps of:
- feeding each frame of video data into an encoder to produce a sequence of visual features;
- passing the sequence of visual features through a deep convolutional network to obtain a posterior of a dynamic latent variable and a posterior of a static latent variable;
- applying Jensen-Shannon divergence for a penalty of static embedding and maximum mean discrepancy for a penalty of dynamic embeddings, and simultaneously minimizing a Wassertein distance and a Kullback-Liebler divergence regularization to trigger representation disentanglement;
- sampling static and dynamic representations from the posterior of the static latent variable and the posterior of the dynamic latent variable, respectively, with a general sample-based mutual information upper bound employed with a neural network to approximate a conditional distribution to facilitate minimization of a disentangled representation learning (DRL) objective and to reduce dependency of static and dynamic embeddings; and
- concatenating the static and dynamic representations to be fed into a decoder to generate reconstructed sequences.

7. The non-transitory computer-readable storage medium of claim 6, wherein mutual information of a static factor and a dynamic factor is introduced as a regulator.

8. The non-transitory computer-readable storage medium of claim 7, wherein the mutual information of the static factor is minimized with content embedding and the mutual information of the dynamic factor is minimized with motion embedding to enable mutual exclusivity between the static and dynamic factors.

9. The non-transitory computer-readable storage medium of claim 7, wherein a set of orthogonal directions is learned in a latent space of generative adversarial networks (GANs) to produce meaningful transformations in an image space and to define a disentangled projected latent space by its transpose.

10. The non-transitory computer-readable storage medium of claim 9, wherein an orthogonal linear transformation that maps latent space of the GANs to a disentangled latent space with low total correlation (TC) is learned, where an additional loss term minimizes a total correlation of projected latent vectors and forces orthogonality of the linear transformation.

11. A system for learning disentangled representations of videos, the system comprising:
- a memory; and
- one or more processors in communication with the memory configured to:
  - feed each frame of video data into an encoder to produce a sequence of visual features;
  - pass the sequence of visual features through a deep convolutional network to obtain a posterior of a dynamic latent variable and a posterior of a static latent variable;
  - apply Jensen-Shannon divergence for a penalty of static embedding and maximum mean discrepancy for a penalty of dynamic embeddings, and simultaneously minimizing a Wassertein distance and a Kullback-Liebler divergence regularization to trigger representation disentanglement;
  - sampling static and dynamic representations from the posterior of the static latent variable and the posterior of the dynamic latent variable, respectively, with a general sample-based mutual information upper bound employed with a neural network to approximate a conditional distribution to facilitate minimization of a disentangled representation learning (DRL) objective and to reduce dependency of static and dynamic embeddings; and
  - concatenate the static and dynamic representations to be fed into a decoder to generate reconstructed sequences.

12. The system of claim 11, wherein mutual information of a static factor and a dynamic factor is introduced as a regulator.

13. The system of claim 12, wherein the mutual information of the static factor is minimized with content embedding and the mutual information of the dynamic factor is minimized with motion embedding to enable mutual exclusivity between the static and dynamic factors.

14. The system of claim 11, wherein a set of orthogonal directions is learned in a latent space of generative adversarial networks (GANs) to produce meaningful transformations in an image space and to define a disentangled projected latent space by its transpose.

15. The system of claim 14, wherein an orthogonal linear transformation that maps latent space of the GANs to a disentangled latent space with low total correlation (TC) is learned, where an additional loss term minimizes a total correlation of projected latent vectors and forces orthogonality of the linear transformation.

* * * * *